(12) United States Patent
Nolan

(10) Patent No.: US 10,087,087 B2
(45) Date of Patent: *Oct. 2, 2018

(54) WATER DISTRIBUTION SYSTEM WITH DUAL USE WATER TREATMENT UNIT

(71) Applicant: International Water-Guard Industries, Inc., Burnaby (CA)

(72) Inventor: Peter Daniel Nolan, North Vancouver (CA)

(73) Assignee: International Water-Guard Industries, Inc., Surrey, B.C. (CA)

( * ) Notice: Subject to any disclaimer, the term of this patent is extended or adjusted under 35 U.S.C. 154(b) by 253 days.

This patent is subject to a terminal disclaimer.

(21) Appl. No.: 15/133,165

(22) Filed: Apr. 19, 2016

(65) Prior Publication Data
US 2016/0229703 A1    Aug. 11, 2016

Related U.S. Application Data

(63) Continuation of application No. 13/941,771, filed on Jul. 15, 2013, now Pat. No. 9,409,795, which is a
(Continued)

(51) Int. Cl.
*C02F 1/00* (2006.01)
*B01D 35/027* (2006.01)
(Continued)

(52) U.S. Cl.
CPC ............ *C02F 1/006* (2013.01); *B01D 35/027* (2013.01); *B01D 35/157* (2013.01);
(Continued)

(58) Field of Classification Search
CPC ...... B01D 21/30; B01D 35/02; B01D 35/027; B01D 35/153; B01D 35/157;
(Continued)

(56) References Cited

U.S. PATENT DOCUMENTS 2,932,331 A   4/1960   Reed
2,940,595 A   6/1960   Crane
(Continued)

OTHER PUBLICATIONS

Office Action in related Canadian Patent Application No. 2,686,836 dated Nov. 3, 2015.
(Continued)

*Primary Examiner* — Joseph W Drodge
(74) *Attorney, Agent, or Firm* — Troutman Sanders LLP; Ryan A. Schneider

(57) ABSTRACT

A water distribution system having a dual use water treatment unit. The same water treatment unit can be used to treat water supplied from a fill port to a storage tank during a fill operation, as well as water leaving the storage tank for supply to one or more points of water use during a supply operation. When a diverter valve is in a fill position, water supplied to the fill port can flow through the diverter valve and to the water treatment unit for treatment then to the storage tank for storage. When the diverter valve is in a supply position, the water from the storage tank can be delivered using means for pressurizing water to the same treatment unit for treatment, then through the diverter valve and to a point of water use device.

17 Claims, 5 Drawing Sheets

Related U.S. Application Data continuation of application No. 12/628,752, filed on Dec. 1, 2009, now Pat. No. 8,568,585.

(60) Provisional application No. 61/193,453, filed on Dec. 1, 2008.

(51) Int. Cl.

| | | |
|---|---|---|
| *B01D 35/157* | (2006.01) | |
| *B01D 36/04* | (2006.01) | |
| *C02F 1/28* | (2006.01) | |
| *C02F 1/32* | (2006.01) | |

(52) U.S. Cl.
CPC ......... *B01D 35/1573* (2013.01); *B01D 36/04* (2013.01); *C02F 1/004* (2013.01); *C02F 1/283* (2013.01); *C02F 1/325* (2013.01); *B01D 2201/165* (2013.01); *C02F 1/001* (2013.01); *C02F 2201/001* (2013.01); *C02F 2301/04* (2013.01); *Y10T 137/0318* (2015.04); *Y10T 137/86035* (2015.04); *Y10T 137/86493* (2015.04); *Y10T 137/86558* (2015.04)

(58) Field of Classification Search
CPC .... B01D 35/1573; B01D 36/00; B01D 36/04; B01D 2201/16; B01D 2201/165; B01D 2201/167; B01D 2221/08; B01D 2221/265; B01D 24/002; B01D 24/38; B01D 24/383; B01D 24/386; B01D 24/40; B01D 29/005; B01D 29/88; B01D 29/885; B01D 29/90; B01D 29/92; B01D 35/15; B01D 2201/54; C02F 1/001; C02F 1/006; C02F 1/20; C02F 1/283; C02F 1/32; C02F 1/325; C02F 2201/001; C02F 2201/005; C02F 2201/326; C02F 2301/04; C02F 2301/043; C02F 2301/046; C02F 1/004; Y10T 137/86558; Y10T 137/0318; Y10T 137/86493; Y10T 137/86035
USPC ....... 210/134, 141, 143, 192, 167.01, 172.1, 210/172.6, 194, 195.1, 205, 120, 257.1, 210/257.2, 258, 259, 335, 416.1, 418, 210/420, 424, 760, 764, 109, 110, 117, 210/136, 248, 340, 341; 137/565.01, 137/565.26, 571, 624.11, 625.18; 222/52, 222/63, 64, 189.06, 189.11
See application file for complete search history.

(56) References Cited

U.S. PATENT DOCUMENTS

| | | | |
|---|---|---|---|
| 4,176,063 A | 11/1979 | Tyler | |
| 4,324,656 A | 4/1982 | Godar | |
| 4,427,551 A | 1/1984 | Duveau | |
| 4,599,166 A | 7/1986 | Gesslauer | |
| 4,764,271 A * | 8/1988 | Acosta | C02F 1/02 210/143 |
| 4,871,452 A | 10/1989 | Kohler et al. | |
| 4,876,002 A | 10/1989 | Marshall et al. | |
| 5,045,215 A | 9/1991 | Lamarre | |
| 5,353,491 A * | 10/1994 | Gentry | H02K 1/17 228/173.2 |
| 5,443,733 A | 8/1995 | Mueller et al. | |
| 5,660,721 A | 8/1997 | Kyriss et al. | |
| 5,711,038 A | 1/1998 | Niethammer et al. | |
| 6,027,642 A | 2/2000 | Prince | |
| 6,074,551 A * | 6/2000 | Jones | B01D 61/025 210/106 |
| 6,174,437 B1 * | 1/2001 | Haney | B01D 61/025 210/104 |
| 6,533,927 B1 * | 3/2003 | Hosaka | B23H 1/10 210/167.01 |
| 6,579,445 B2 | 6/2003 | Nachtman et al. | |
| 6,764,595 B1 * | 7/2004 | Halemba | B01D 61/08 137/590 |
| 6,773,588 B2 | 8/2004 | Beeman et al. | |
| 7,666,317 B2 | 2/2010 | Hsueh et al. | |
| 7,775,374 B1 | 8/2010 | Barker | |
| 7,793,681 B2 | 9/2010 | Apostolides | |
| 7,931,810 B2 | 4/2011 | Gaigner et al. | |
| 8,568,585 B2 * | 10/2013 | Nolan | C02F 1/004 137/625.18 |
| 9,409,795 B2 * | 8/2016 | Nolan | C02F 1/004 |
| 2005/0126927 A1 | 1/2005 | Lindauer | |
| 2005/0103725 A1 | 5/2005 | Palm et al. | |
| 2005/0103726 A1 | 5/2005 | Palm et al. | |
| 2006/0011525 A1 | 1/2006 | Hoffjann et al. | |
| 2006/0130481 A1 * | 6/2006 | Browe | B01D 61/025 60/641.8 |
| 2006/0169645 A1 | 8/2006 | Hsueh | |
| 2006/0169649 A1 | 8/2006 | Hsueh et al. | |
| 2009/0032446 A1 | 2/2009 | Wiemers | |
| 2009/0057239 A1 | 3/2009 | Walker | |
| 2012/0285897 A1 | 11/2012 | Fike | |

OTHER PUBLICATIONS

Notice of Allowance dated May 3, 2016 in related U.S. Appl. No. 13/941,771.

\* cited by examiner

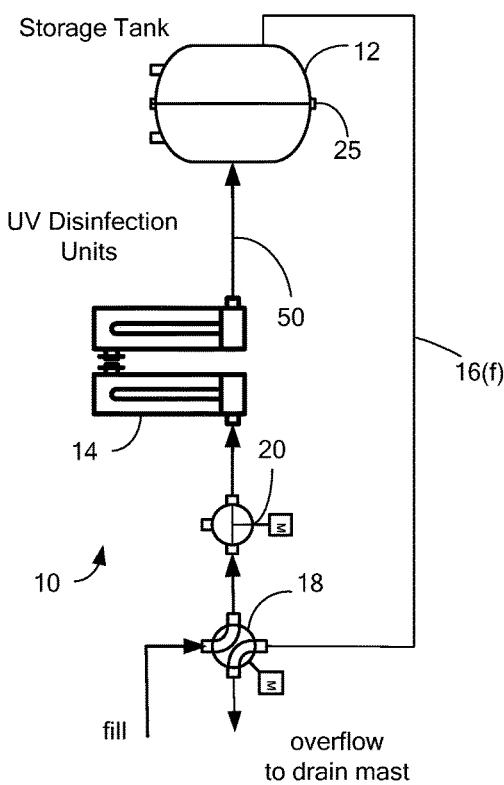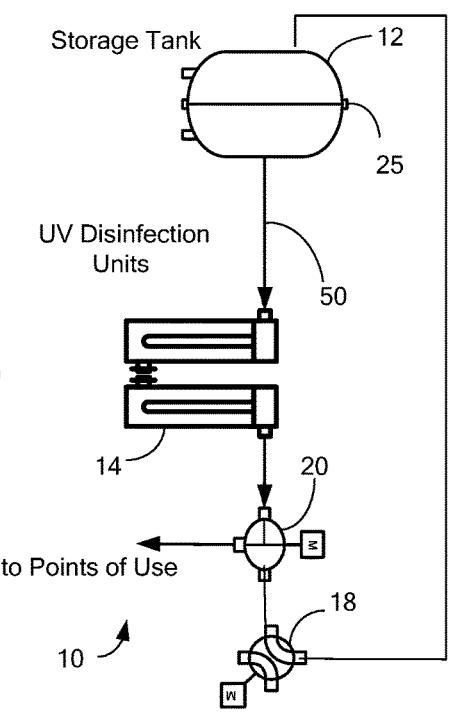
FILL MODE
Figure 3
SUPPLY MODE
Figure 4

WATER DISTRIBUTION SYSTEM WITH DUAL USE WATER TREATMENT UNIT

CROSS-REFERENCE TO RELATED APPLICATIONS

This application is a continuation of application Ser. No. 13/941,771, filed 15 Jul. 2013, which application is a continuation of application Ser. No. 12/628,752, filed 1 Dec. 2009, (now U.S. Pat. No. 8,568,585), which application claims the benefit of U.S. Provisional Application No. 61/193,453, filed 1 Dec. 2008, each of which is incorporated herein by reference in its entirety as if fully set forth below.

BACKGROUND OF THE INVENTION

1. Field of Invention

This invention relates generally to a water distribution system, and in particular to a water distribution system having a dual use water treatment unit.

2. Background of the Invention

Water treatment units (WTUs) for the purification of potable water on aircraft or other vehicles have been known for years. For example, International Water-Guard Industries Inc. provides different models of flight-certified water treatment units for aircraft applications. Certain known WTUs employ ultraviolet (UV) lamps that inactivate micro-organisms including pathogens by irradiation with UV light in the germicidal wavelength range. This process is customarily referred to as UV disinfection. The WTUs sometimes are also supplied with either sediment or activated carbon filters for the removal of fine particulate matter or dissolved chlorine or organic matter to improve the taste of the water.

In known aircraft water treatment systems, WTUs are generally installed in one of two locations on an aircraft. They may be installed at the exit of a potable water storage tank so that all the water delivered from the tank to aircraft points of use is disinfected, whether the water is delivered under pressure to points of use on demand or water is circulating continuously. Alternatively, WTUs may be installed at selected points of use on the aircraft, such as galleys where food and beverages are prepared or for VIP showers.

Aircraft manufacturers or aircraft completion centers have enquired about treating water as it is being uploaded onto the aircraft on the ground. Proposed solutions have included integrating additional WTUs into the aircraft potable water fill system. These proposals are not optimal due to the additional cost of WTUs that would be used during the fill operation, and the weight and complexity of the WTUs should they be installed on the aircraft. Another drawback is that past proposals for WTUs to be used for fill operations are installed further from the point of water use and thus are generally regarded as providing less protection to human health since there is more opportunity for contamination downstream of the treatment units.

Disadvantages of conventional systems are known, and exemplified by prior art. For example, U.S. Pat. No. 5,660,721 discloses a conduit 22 that connects a diverter valve 23 to the WTU 26, and conduit 48 connects the WTU 26 to diverter valve 50, such that when valve 23 is in the fill position water flows from the fill port 16 to the WTU 26 through conduit 22 and when diverter valve 50 is in the supply position water flows from the WTU 26 to the point of water use device 12 through conduit 48. Therefore different conduits are used to transport the water to and from the WTU.

U.S. Pat. No. 5,045,215 discloses a system for removing contaminants from domestic water supplies using an accumulator tank 68; however, the purified water from this tank is always pumped to a point of use device (see FIG. 2 and column 12 lines 16 to 54); there is no disclosure or suggestion that the water flow can be diverted by a diverter valve for any purpose, let alone to allow a water treatment unit to treat water during a fill operation.

U.S. Pat. No. 7,775,374 discloses a water purification unit comprising a pump 114 to draw water from a water source 102; this water is passed through a main filter 132 to purify the water and dispensed through an outlet 136 (Abstract, FIG. 1). The pump always pumps water from the water source to the outlet; notably, this reference does not disclose or suggest that the water can be diverted by a diverter valve for any purpose, let alone to allow a filter (or other water treatment unit) to treat water during a fill operation, e.g. to fill the expansion tank 150.

Instead, it discloses an optional prefilter 120 that can be provided between the pump and an expansion tank 150 to remove larger particulate, bacteria, viruses. As noted above, prior art water treatment systems are known to use multiple water treatment units to treat water during a fill operation, as well as to treat water during a supply operation; however, such approaches are not optimal due to the additional cost, weight and complexity of using multiple water treatment units. U.S. Pat. No. 7,775,374 is no different. Using multiple filters presents the same challenges that the present invention is intended to overcome.

SUMMARY OF THE INVENTION

It is an objective of the invention to provide a solution to at least some of the known problems in the prior art.

The presently claimed water distribution system includes a water storage tank and a primary water treatment unit (WTU) that can be used to treat water as it is being loaded onto an aircraft during a fill operation of the storage tank, as well as being used to treat water as it is being delivered from the storage tank to various point of use devices in the aircraft during a supply operation.

This functionality is provided in part by a diverter valve that is movable between (a) a fill position wherein the primary WTU is in fluid communication with the fill port such that the loaded water can be treated during the fill operation, and (b) a supply position wherein the primary WTU is in fluid communication with the point of use devices such that water in the storage tank treated by the WTU during the supply operation can be supplied to the point of water use devices.

The present invention as claimed is a water distribution system comprising, inter alia, a diverter valve conduit fluidly coupling at least one diverter valve to the primary water treatment unit, wherein the diverter valve is movable between a fill position wherein water flows from the fill port to the primary water treatment unit in one direction through the diverter valve conduit, and a supply position wherein water flows from the primary water treatment unit to the at least one point of water use device in an opposite direction through the diverter valve conduit.

Thus, for example, the present invention overcomes the disadvantages in U.S. Pat. No. 5,660,721, as that reference provides no hint or disclosure that the water flows through the same conduit in one direction to the WTU when the diverter valve is in the fill position and in the opposite direction from the WTU when the diverter valve is in the supply position. In the present water distribution system, fewer conduits are required to transport the water to and from the WTU than disclosed in U.S. Pat. No. 5,660,721, as there is only one diverter valve conduit fluidly coupling the diverter valve to the primary WTU. It is expected that this enables the present invention to take up less space that the system disclosed in U.S. Pat. No. 5,660,721 and advantageously be used on an aircraft where space is limited.

Further, since U.S. Pat. No. 5,045,215 does not disclose or suggest any diversion of water flow through the water treatment system, it follows that U.S. Pat. No. 5,045,215 fails to disclose a diverter valve conduit fluidly coupling the diverter valve to a primary water treatment unit.

Further, U.S. Pat. No. 7,775,374 also does not disclose or suggest a diverter valve and a diverter valve conduit fluidly coupling the diverter valve to the primary water treatment unit.

According to one aspect of the invention, there is provided a water distribution system comprising a water storage tank, water conduits, a primary water treatment unit, a diverter valve, and means for pressurizing water in fluid communication with the storage tank. The water conduits fluidly couple a fill port to the diverter valve, fluidly couple the diverter valve to the primary water treatment unit, fluidly couples the primary water treatment unit to the storage tank, and fluidly couples the diverter valve to at least one point of water use device. The diverter valve is movable between a fill position wherein the primary water treatment unit is in fluid communication with the fill port and not the point of water use device, and a supply position wherein the primary water treatment unit is in fluid communication with the at least one point of water use device and not the fill port. The primary water treatment unit can comprise an ultraviolet lamp module, and can further comprise an activated carbon or sediment or other type of filter module.

The system can further include a four port fill valve and a water drain conduit fluidly coupling the storage tank to the fill valve. The fill valve has two bores and is movable between a fill position wherein a first bore is in fluid communication with the water conduit fluidly coupling the fill port to the diverter valve and a second bore is in fluid communication with a drain port and the storage tank via the drain conduit, and a supply position wherein the fill and drain ports are not in fluid communication with the system. The fill valve can be caused to change position in a number of ways. An example would be to be motorized and electrically communicative with a selector switch or a programmable controller. Alternatively, the fill valve can be a four port manual valve connectable to a push-pull cable coupled to a mechanical switch.

The means for pressurizing water can be a pump. In such case, the system can further comprise an isolation valve fluidly coupled to the fluid conduit fluidly coupling the primary water treatment unit to the storage tank. The isolation valve is movable between a fill position in which fluid is flowable through the isolation valve, and a supply position in which water is not flowable through the isolation valve. Also, the water conduits can further comprise a water conduit having a one way valve and fluidly coupling the pump to the primary water treatment unit. The one way valve is positioned to allow fluid to flow from the pump to the primary water treatment unit only, such that when the diverter valve and isolation valve are in the supply position the pump is operable to flow water from the storage tank through the primary water treatment unit and to the at least one point of use device. The isolation valve can be motorized and electrically communicative with a selector switch or a programmable controller. Alternatively, the isolation valve can be a manual or solenoid operated valve.

The diverter valve can be a single three port diverter valve or a pair of two port diverter valves. The diverter valve(s) can also be motorized and electrically communicative with a selector switch or a programmable controller. Alternatively, the diverter valve(s) can be a manual valve connectable to a push-pull cable coupled to a mechanical switch.

The system can further include at least one supplementary water treatment unit fluidly coupled to at least one of the water conduits and in series with the primary water treatment unit.

Instead of a pump, the means for pressurizing the water system can be a bleed air port in the water tank that can receive bleed air from an aircraft engine. An auxiliary air compressor can be fluidly coupled to the bleed air port.

In an exemplary embodiment, the present invention comprises a water distribution system comprising a water storage tank, a primary water treatment unit, at least one diverter valve, water conduits fluidly coupling a fill port to the diverter valve, fluidly coupling the diverter valve to the primary water treatment unit, coupling the primary water treatment unit to the storage tank, and fluidly coupling the diverter valve to at least one point of water use device, and means for pressurizing water in fluid communication with the storage tank, the at least one diverter valve being movable between a fill position wherein the primary water treatment unit is in fluid communication with the fill port and not the point of water use device, and a supply position wherein the primary water treatment unit is in fluid communication with the at least one point of water use device and not the fill port.

The system can further comprise a four port fill valve and a water drain conduit fluidly coupling the storage tank to the fill valve, the fill valve having two bores and being movable between a fill position wherein a first bore is in fluid communication with the water conduit fluidly coupling the fill port to the diverter valve and a second bore is in fluid communication with a drain port and the storage tank via the drain conduit, and a supply position wherein the fill and drain ports are not in fluid communication with the system.

The means for pressurizing water can be a pump.

The system can further comprise an isolation valve fluidly coupled to the fluid conduit fluidly coupling the primary water treatment unit to the storage tank and movable between a fill position in which fluid is flowable through the isolation valve, and a supply position in which water is not flowable through the isolation valve.

The water conduits can further comprise a water conduit having a one way valve and fluidly coupling the pump to the primary water treatment unit, the one way valve positioned to allow fluid to flow from the pump to the primary water treatment unit only, such that when the diverter valve and isolation valve are in the supply position the pump is operable to flow water from the storage tank through the primary water treatment unit and to the at least one point of use device.

The isolation valve can be motorized and electrically communicative with a selector switch or a programmable controller.

The isolation valve can be a manual or solenoid operated valve.

The diverter valve can be a single three port diverter valve or a pair of two port diverter valves.

The diverter valve can be a manual valve connectable to a push-pull cable coupled to a mechanical switch.

The fill valve can be motorized and electrically communicative with a selector switch or a programmable controller.

The fill valve can be a four port manual valve connectable to a push-pull cable coupled to a mechanical switch The system can further comprise multiple primary water treatment units fluidly coupled in series to at least one of the water conduits.

The system can further comprise at least one supplemental water treatment unit fluidly coupled to the water conduits in the vicinity of at least one point of water use device.

The means for pressurizing can be a bleed air port in the storage tank and connectable to a bleed air line to receive bleed air from an aircraft engine.

The means for pressurizing can further comprise an auxiliary air compressor fluidly coupled to the bleed air port.

The primary water treatment unit can comprise an ultraviolet lamp module.

The primary water treatment unit can further comprise an activated carbon or sediment filter module.

The water conduits can further comprise a water return conduit having a flow restrictor, and fluidly coupled to the at least one point of water use device and to the storage tank.

In another exemplary embodiment, the present invention comprises a water distribution system comprising a water storage tank, a primary water treatment unit, at least one diverter valve, water conduits fluidly coupling a fill port to the diverter valve, fluidly coupling the diverter valve to the primary water treatment unit, coupling the primary water treatment unit to the storage tank, and fluidly coupling the diverter valve to at least one point of water use device, and means for pressurizing water in fluid communication with the storage tank, the at least one diverter valve comprising a three port valve being movable between a fill position wherein the primary water treatment unit is in fluid communication with the fill port through the three port valve and not in fluid communication with the point of water use device, and a supply position wherein the primary water treatment unit is in fluid communication with the at least one point of water use device through the three port valve and not in fluid communication with the fill port.

In another exemplary embodiment, the present invention comprises a water distribution system comprising a water storage tank, a primary water treatment unit, at least one diverter valve, water conduits fluidly coupling a fill port to the diverter valve, fluidly coupling the diverter valve to the primary water treatment unit, coupling the primary water treatment unit to the storage tank, and fluidly coupling the diverter valve to at least one point of water use device, means for pressurizing water in fluid communication with the storage tank, and a four port fill valve and a water drain conduit fluidly coupling the storage tank to the fill valve, the at least one diverter valve being movable between a fill position wherein the primary water treatment unit is in fluid communication with the fill port and not the point of water use device, and a supply position wherein the primary water treatment unit is in fluid communication with the at least one point of water use device and not the fill port, the fill valve having two bores and being movable between a fill position wherein a first bore is in fluid communication with the water conduit fluidly coupling the fill port to the diverter valve and a second bore is in fluid communication with a drain port and the storage tank via the drain conduit, and a supply position wherein the fill and drain ports are not in fluid communication with the system.

In another exemplary embodiment, the present invention comprises a water distribution system comprising a water storage tank, a primary water treatment unit, at least one diverter valve comprising a manual valve connectable to a push-pull cable coupled to a mechanical switch, water conduits fluidly coupling a fill port to the diverter valve, fluidly coupling the diverter valve to the primary water treatment unit, coupling the primary water treatment unit to the storage tank, and fluidly coupling the diverter valve to at least one point of water use device, and means for pressurizing water in fluid communication with the storage tank, the at least one diverter valve being movable between a fill position wherein the primary water treatment unit is in fluid communication with the fill port and not the point of water use device, and a supply position wherein the primary water treatment unit is in fluid communication with the at least one point of water use device and not the fill port.

In another exemplary embodiment, the present invention comprises a water distribution system comprising a water storage tank, a primary water treatment unit, at least one diverter valve comprising, water conduits fluidly coupling a fill port to the diverter valve, fluidly coupling the diverter valve to the primary water treatment unit, coupling the primary water treatment unit to the storage tank, and fluidly coupling the diverter valve to at least one point of water use device, and means for pressurizing water in fluid communication with the storage tank, wherein the means for pressurizing is a bleed air port in the storage tank and connectable to a bleed air line to receive bleed air from an aircraft engine, the at least one diverter valve being movable between a fill position wherein the primary water treatment unit is in fluid communication with the fill port and not the point of water use device, and a supply position wherein the primary water treatment unit is in fluid communication with the at least one point of water use device and not the fill port.

In another exemplary embodiment, the present invention comprises a water distribution system comprising a water storage tank, a primary water treatment unit, at least one diverter valve, water conduits fluidly coupling a fill port to the at least one diverter valve, fluidly coupling the primary water treatment unit to the storage tank, and fluidly coupling the at least one diverter valve to at least one point of water use device, a diverter valve conduit fluidly coupling the at least one diverter valve to the primary water treatment unit, and means for pressurizing water in fluid communication with the storage tank, the at least one diverter valve being movable between a fill position wherein water flows from the fill port to the primary water treatment unit in one direction through the diverter valve conduit, and a supply position wherein water flows from the primary water treatment unit to the at least one point of water use device in an opposite direction through the diverter valve conduit.

In another exemplary embodiment, the present invention comprises a method of distributing treated water from a water distribution system comprising a water storage tank, a primary water treatment unit, at least one diverter valve, water conduits fluidly coupling a fill port to the at least one diverter valve, fluidly coupling the at least one diverter valve to the primary water treatment unit, fluidly coupling the primary water treatment unit to the storage tank, and fluidly coupling the at least one diverter valve to at least one point of water use device, and means for pressurizing water in fluid communication with the storage tank, the method comprising filing the storage tank with treated water by moving the at least one diverter valve to a fill position wherein the primary water treatment unit is in fluid communication with the fill port and the storage tank but not the point of water use device, such that water flows from the fill port through the primary water treatment unit to the storage tank and is treated by the primary water treatment unit before it enters the storage tank and distributing treated water from the at least one point of water use device by moving the at least one diverter valve to a supply position wherein the primary water treatment unit is in fluid communication with the storage tank and the at least one point of water use device but not the fill port, such that the treated water flows from the storage tank through the water treatment unit to the at least one point of water use device for distribution therefrom and is further treated by the primary water treatment unit before it enters the at least one point of water use device.

These and other objects, features and advantages of the present invention will become more apparent upon reading the following specification in conjunction with the accompanying drawing figure.

BRIEF DESCRIPTION OF DRAWINGS

FIG. 3 is a system schematic of an aircraft water distribution system in a fill mode according to a second embodiment of the invention.

FIG. 4 is a system schematic of the water distribution system shown in FIG. 3 in a supply mode.

DETAILED DESCRIPTION OF EMBODIMENTS OF THE INVENTION

Figure 1:
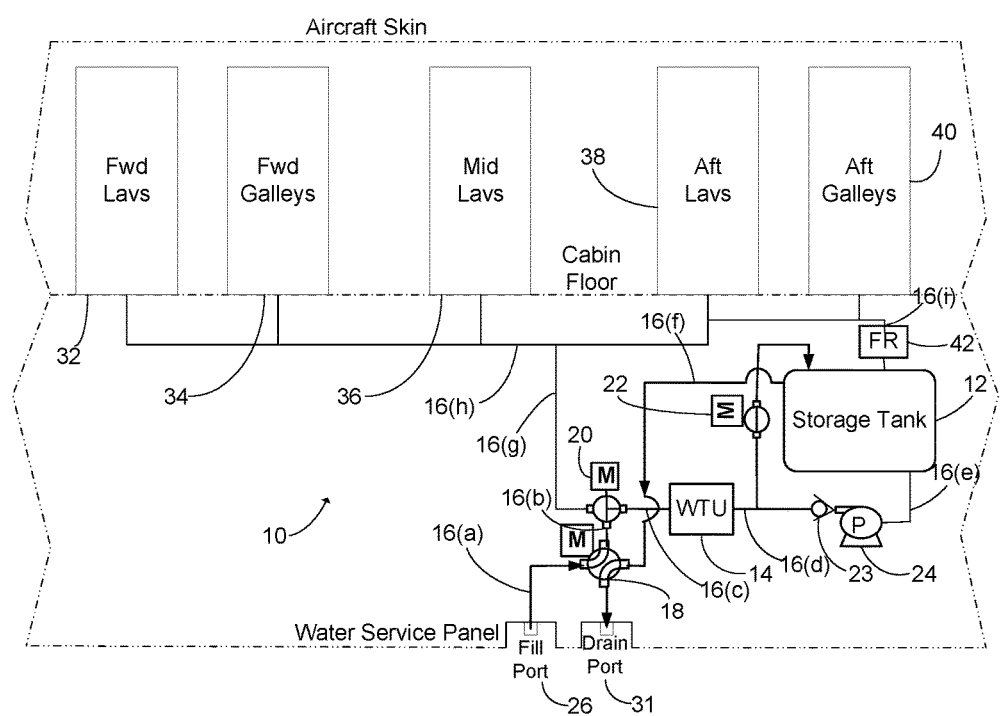
FIG. 1 is a system schematic of an aircraft water distribution system in a fill mode according to one embodiment of the invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" or "nearly free" of something, or "substantially pure", and like char carbon characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Figure 2:
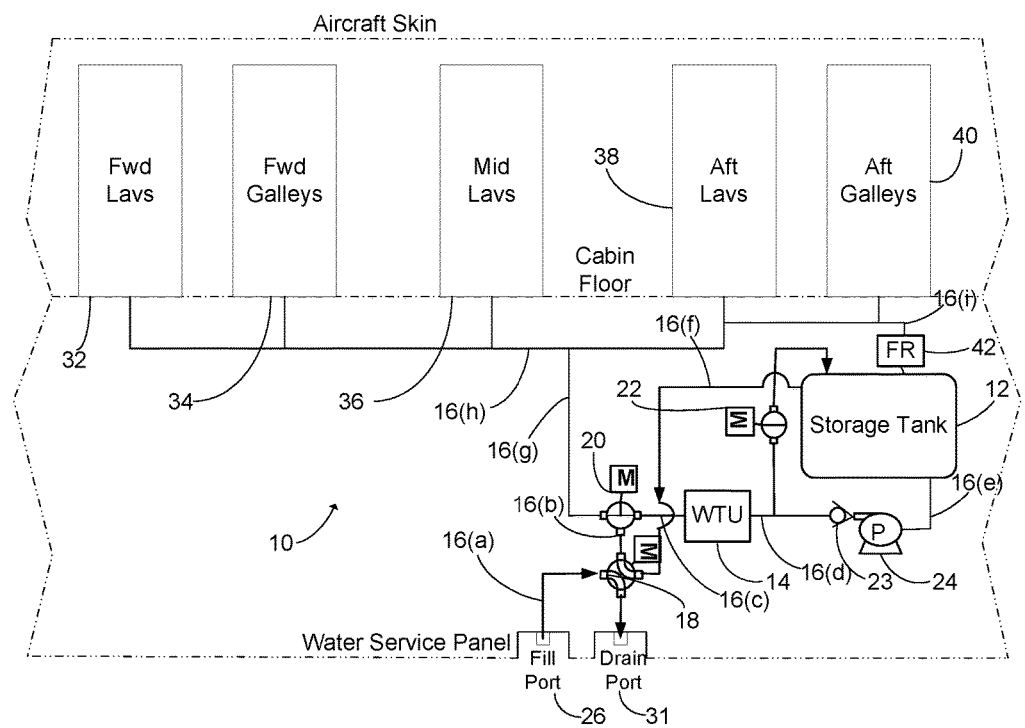
FIG. 2 is a system schematic of the water distribution system shown in FIG. 1 in a supply mode.

According to one embodiment of the invention and referring to FIGS. 1 and 2, a water distribution system 10 is provided for treating water on an aircraft. While this embodiment is directed at use on aircraft, the water treatment system 10 can readily be installed in other applications, and in particular, other vehicular applications.

Apparatus

The water treatment system 10 includes a water storage tank 12 and a primary water treatment unit ("WTU") 14 which can be used to treat water as it is being loaded onto an aircraft during a fill operation ("fill mode") of the storage tank 12, as well as being used to treat water as it is being delivered from the storage tank 12 to various points of use in the aircraft during a supply operation ("supply mode"). By using a single primary WTU 14 for these two uses, cost and weight of the system 10 are significantly reduced.

As can be seen in FIG. 1, the system 10 includes a series of conduits 16 and valves 18, 20, 22, 23 which cooperate with the primary WTU 14 and storage tank 12 to enable the primary WTU 14 to treat water in both fill mode and supply mode. The system 10 also includes a pump 24 coupled to the conduits and which operates to pump water therethrough when in the supply mode. The conduits 16 can be flexible hose or thin-walled stainless steel tubing.

A water fill port 26 is provided on a water service panel 28 of the aircraft. A first water conduit 16(a) extends from the fill port 26 to a four port fill valve 18 such as those commercially available from well known industry suppliers ITT, Sitec or Circle Seal. The fill valve 18 is movable between two positions, namely a fill position and a supply position. In this embodiment, the fill valve 18 is motorized and is electrically communicative with an electrical selector switch (not shown) which is controllable by an operator to move the fill valve 18 between its two positions. Alternatively and not shown, the fill valve 18 can be a four port manual valve actuated by a push-pull cable coupled to a mechanical switch.

The four port fill valve 18 has two bores isolated from each other, and the valve 18 can be positioned so that each bore is in fluid communication with two dedicated ports. When the fill valve 18 is in the fill position, the first water conduit 16(a) fluidly communicates with one of the bores by coupling to one of the ports of that bore; the other port of this bore fluidly couples to a second water conduit 16(b) which in turn is fluidly coupled to a three port diverter valve 20 such as those commercially available from well known industry suppliers ITT, Sitec or Circle Seal.

Like the fill valve 18, the diverter valve 20 is motorized and is electrically communicative with an electrical switch operable by the operator to move the diverter valve 20 between a fill position and a supply position. Alternatively, the diverter valve 20 can be manually operated by a push-pull cable (not shown). The diverter valve 20 has three ports: a first port is fluidly coupled to the second water conduit 16(b); a second port is fluidly coupled to a third water conduit 16(c) which in turn is fluidly coupled to an inlet of the primary WTU 14; and a third port is fluidly coupled to a point of water use supply conduit 16(g) which is fluidly coupled to various points of use within the aircraft. When the diverter valve 20 is moved to the fill position, the first and second ports are fluidly interconnected such that there is a fluid pathway between the second water conduit 16(b) and the third water conduit 16(c), and the third port is not connected to either the first or second ports such that the point of water use supply conduit 16(g) is blocked. When the diverter valve 20 is moved to the supply position, the second and third ports are fluidly interconnected such that there is a fluid pathway between the third water conduit 16(c) and the point of water use supply conduit 16(g)) and the first port is not connected to either the first or second ports such that the second water conduit 16(b) is blocked.

The primary WTU 14 in this embodiment is an aircraft potable WTU unit, and can be for example, one of the water treatment units commercially available from International Water Guard Inc., such as the NPS-A2, NPS-A3, and NPS or IWG-A4 and NPS or IWG-A6. Depending on the model, the primary WTU 14 can be fitted with an ultraviolet lamp module for ultraviolet light disinfection alone or the UV lamp module with an activated carbon or sediment filter module for particulate filtration. The model selected will depend on flow rate required and whether there is a need for UV disinfection alone or UV disinfection coupled with filtration.

Water entering through the third water conduit 16(c) is treated by the primary WTU 14 and is discharged through an outlet that is fluidly coupled to a fourth water conduit 16(d). This water conduit 16(d) extends from the primary WTU 14 to a T-junction which fluidly connects the fourth water conduit 16(d) to a supply water inlet of the storage tank 12 via a first pathway, and to the pump 24 via a second pathway. A one way check valve 23 in the second pathway prevents water flowing from the primary WTU 14 to enter the pump 24 through the second pathway. A motorized isolation valve 22, such as those commercially available from well known industry suppliers ITT, Sitec or Circle Seal, in the first pathway is movable between an opened (fill) position and a closed (supply) position; the valve 22 is in electrical communication with an electrical selector switch which can be operated by an operator to open and close the isolation valve 22. Alternatively, the isolation valve can be a manual or solenoid operated valve.

The pump 24 in this embodiment is a commercially available potable water pump such as those provided by International Water Guard Inc. The pump 24 can be a centrifugal stainless steel or specialty plastic pump selected for the flow rate and pressure required. A spare pump (not shown) can be installed in the system 10 as a back-up. The pump is electrically communicative with a switch (not shown) that is operable by an operator to control operation of the pump.

Alternatively, and not shown, the fill valve 18, diverter valve 20, isolation valve 22 and pump 24 can be electrically communicative with a processor or controller (not shown) which in turn can be programmed to move the valves under certain specified conditions, or be operated by an operator via an input device (not shown).

The storage tank 12 has a supply water outlet which is fluidly coupled to a pump supply conduit 16(e) which extends to and is fluidly coupled to a water inlet of the pump 24. The storage tank 12 size, form and construction will depend on the aircraft type, and suitable such tanks are readily available from numerous aircraft OEM suppliers.

The storage tank 12 also has a drain outlet near the top of the storage tank 12. A drain conduit 16(f) extends from the drain outlet and fluidly couples with a port of the fill valve 18; this port is coupled to the second of the two bores in the fill valve 18 when the fill valve 18 is in the fill position. The second bore is also coupled to a drain port 31 via drain port conduit 33 when the fill valve 18 is in the fill position, thereby enabling water flowing out of the tank's drain outlet to drain out of drain port 31.

The system 10 also includes conduits 16(g)-(i) that distribute water from the storage tank 12 to various points of water use within the aircraft. FIGS. 1 and 2 show exemplary points of use, namely, forward lavatories 32, forward galleys 34, middle lavatories 36, aft lavatories 38, and aft galleys 40. The point of water use supply conduit 16(g) extends from the diverter valve 20 to a point of water use distribution conduit 16(h) that is fluidly coupled to each of the points of use 32, 34, 36, 38, 40. Optionally, the point of water use distribution conduit 16(h) is also fluidly coupled to a return conduit 16(i) which returns water back to the storage tank 12 via a water recirculation inlet of the storage tank 12. A flow restrictor 42 is installed on the return conduit 16(i) immediately upstream of the water recirculation inlet of the storage tank 12.

The system 10 can be typically installed in the aircraft underneath the cabin floor, but other locations may be appropriate for a given aircraft design. The conduits that distribute water to the various points of use 32, 34, 36, 38, 40 are routed through the floor to the respective point of water use.

Operation: Fill Mode

Referring now to FIG. 1, in fill mode operation, the fill valve 18 and diverter valve 20 are set to their respective fill positions, and the isolation valve 22 is set to its open (fill) position. When the aircraft is on the ground, a water supply source (not shown, e.g. a water tanker) is fluidly coupled to the fill port 26 and supplies pressurized water to the system 10. The water flows from the fill port 26 through the first water conduit 16(a), fill valve 18, second water conduit 16(b), diverter valve 20, third water conduit 16(c), and into the primary WTU 14. The water is treated in the primary WTU 14 and is then flowed through the fourth water conduit 16(d), isolation valve 22 and into the storage tank 12. Water can be supplied to the system until the tank 12 is filled and water drains from the tank 12 through the drain conduit 16(f), fill valve 18 and out of the aircraft through the drain port 31.

The primary WTU 14 operates to treat the incoming water such that the water is disinfected and optionally filtered before it reaches the storage tank. Water treatment at this location is expected to reduce or eliminate the amount of biofilm growth in the storage tank 12, thereby reducing or eliminating the need to regularly clean the tank 12. Also, the treatment at this location in addition to treatment at the tank exit, which occurs during supply mode as will be described below, results in an overall disinfection and filtration that is higher than treatment at tank exit alone.

Operation: Supply Mode

Referring now to FIG. 2, and during the supply mode, the fill valve 18 and diverter valve 20 are set to their respective supply positions, and the isolation valve 22 is set to its closed (supply) position. In the supply position, the fill valve 18 has one bore fluidly connecting the drain conduit 16(*f*) to the closed first port of the diverter valve 20, thereby effectively closing the drain conduit 16(*f*) from the drain port 31. The second bore of the fill valve 18 connects the fill port 26 to the drain port 31, effectively closing these two ports 26, 31 from the rest of the system 10. In the supply position, the diverter valve 20 fluidly couples the third water conduit 16(*c*) to the point of water use supply conduit 16(*g*).

In operation, the pump 24 is activated and pumps water from the storage tank 12 with sufficient pressure to open the check valve 23. Water flows from the tank 12, through the pump 24, check valve 23, fourth water conduit 16(*d*) and into the primary WTU 14 (the isolation valve 22 being closed prevents water from returning to the storage tank 12). This water is treated in the primary WTU 14 and discharged into the third water conduit 16(*c*), through the diverter valve 20 and into the point of water use supply conduit 16(*g*). The water is then distributed via the point of water use distribution conduit 16(*h*) to each of the points of use 32, 34, 36, 38, 40. Water not used by the points of use can flow back into the storage tank through water return conduit 16 (*i*). This feature allows the pump 24 to operate continuously and provide a level of continuous disinfection for the water stored in the tank 12.

Optional Features and Alternative Embodiments

Optionally, the system 10 can be provided with additional WTUs ("supplementary WTUs", not shown) that treat water at other locations in the system 10, such as in the aircraft galleys or lavatories, where the WTU's are located in fluid communication with the water lines before reaching the water line outlet, which can typically be a faucet or coffee maker or other water using device.

Optionally, the system 10 can be provided with multiple primary WTUs 14. More than one primary WTU may be required for larger aircraft, or depending on the specified fill rate and UV dosage. In cases where more than one WTU is required, the primary WTUs can be arranged either in series or in parallel, and located between the diverter valve 20 and the storage tank 12.

Optionally, the system 10 can be provided with a water circulation sub-system in which all of the points of use 32, 34, 36, 38, 40 are supplied by a water loop that extends throughout the aircraft and returns to the storage tank 12; an example of such a sub-system is the Circulating Water Potable Water System (C-PWS™) supplied by International Water Guard.

Alternatively, the system 10 can be provided without a pump. In such case, the system operates by pressurizing the water in the storage tank 12 with bleed air from the aircraft engines, which in some cases are assisted with an auxiliary air compressor, or with other known means for pressurizing the water. According to a second embodiment and referring to FIGS. 3 and 4 a simpler water treatment system is provided which is pumpless, and which uses a single water conduit 50 to connect the primary WTU 14 to the storage tank 12. In operation, the bleed air or other water pressurizing means is used to supply water out of this single water conduit 50 to the primary WTU 14 and through the diverter valve 20 to the various points of water use (not shown in FIGS. 3 and 4) The bleed air is fed through a bleed air line (not shown) connected to the system through a port 25 in the pressurized water storage tank. When an auxiliary air compressor is installed on an aircraft, it too is connected to the system through the same port in the pressurized water storage tank. When in fill mode, water is supplied to the storage tank 12 thorough the same water conduit 50; overflow water drains out of the storage tank 12 via drain conduit 16(*f*) to a drain port (not shown) in the same manner as described in the first embodiment.

Figure 5:
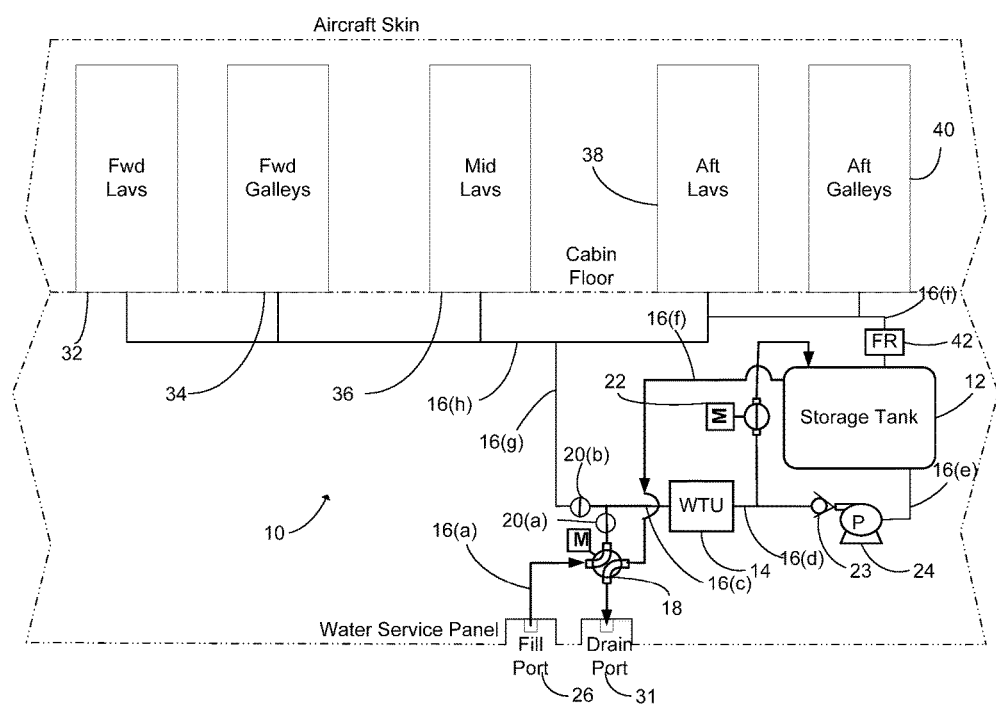
FIG. 5 is a system schematic of an aircraft water distribution system having two diverter valves in a fill mode according to a third embodiment of the invention.
Figure 6:
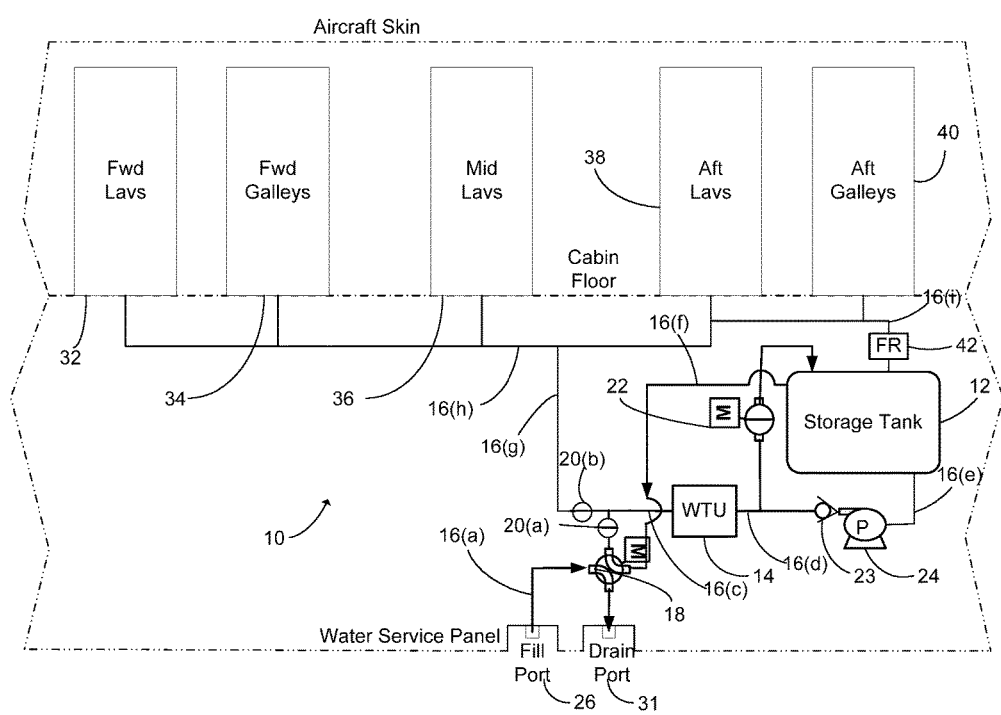
FIG. 6 is a system schematic of the water distribution system shown in FIG. 5 with the diverter valves in a supply mode.

According to a third embodiment and referring to FIGS. 5 and 6, the system 10 can be provided with a pair of two-port diverter valves instead of a single three port diverter valve as present in the first two embodiments. A first two-port diverter valve 20(*a*) is fluidly coupled to second water conduit 16(*b*) and a second two-port diverter valve 20(*b*) is fluidly coupled to point of water use supply conduit 16(*g*). When in a fill mode, the first two port diverter valve 20(*a*) is set to an opened position and the second two port diverter valve 20(*b*) is set to a closed position such that water is flowable from the fill port 26 through the fill valve 18, through the first two port diverter valve 20(*a*) and to the water treatment unit 14 and tank 12; the second two port diverter valve 20(*b*) prevents water from flowing to the point of water use devices. When in a supply mode, the first two port diverter valve 20(*a*) is in a closed position and the second two port diverter valve 20(*b*) is in an opened position such that water from the tank 12 can be pumped by pump 24 through the WTU 14, through the second two port diverter valve and to the points of water use; the closed first two port diverter valve 20(*a*) prevents this water from flowing to the fill port 26.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A water distribution system comprising:
   a water storage tank;
   a first primary water treatment unit;
   a diverter valve;
   a point of water use device;
   a fill port fluidly communicable with a water supply source;
   water conduits fluidly coupling the fill port to the diverter valve, fluidly coupling the first primary water treatment unit to the water storage tank, and fluidly coupling the diverter valve to the point of water use device;
   a diverter valve conduit fluidly coupling the diverter valve to the first primary water treatment unit; and
   a pressurizing water device in fluid communication with the water storage tank;
   wherein the diverter valve is movable between a fill position wherein water from the water supply source flows from the fill port to the first primary water treatment unit in one direction through the diverter valve conduit when the fill port is in fluid communication with the water supply source, and a supply position wherein water from the water storage tank flows from the first primary water treatment unit to the point of water use device in an opposite direction through the diverter valve conduit.

2. The water distribution system as claimed in claim 1, wherein the pressurizing water device is a pump.

3. The water distribution system as claimed in claim 2 further comprising an isolation valve fluidly coupled to the water conduit fluidly coupling the first primary water treatment unit to the water storage tank and movable between a fill position in which water is flowable through the isolation valve, and a supply position in which water is not flowable through the isolation valve.

4. The water distribution system as claimed in claim 3, wherein the water conduits further fluidly couple the pump to the first primary water treatment unit via a water conduit having a one way valve, the one way valve positioned to allow water to flow from the pump to the first primary water treatment unit only, such that when the diverter valve and isolation valve are in the supply position the pump is operable to flow water from the water storage tank through the first primary water treatment unit and to the point of use device.

5. The water distribution system as claimed in claim 3, wherein the isolation valve is motorized and electrically communicable with a selector switch or a programmable controller.

6. The water distribution system as claimed in claim 3, wherein the isolation valve is a manually operated valve.

7. The water distribution system as claimed in claim 3, wherein the isolation valve is a solenoid operated valve.

8. The water distribution system as claimed in claim 1, wherein the diverter valve is a three port diverter valve.

9. The water distribution system as claimed in claim 1 further comprising a second primary water treatment unit, wherein the first and second primary water treatment units are arranged in series and fluidly coupled to the diverter valve conduit.

10. The water distribution system as claimed in claim 1 further comprising a supplemental water treatment unit fluidly coupled to the water conduits between the diverter valve and the point of water use device.

11. The water distribution system as claimed in claim 1, wherein the first primary water treatment unit comprises an ultraviolet lamp module.

12. The water distribution system as claimed in claim 11, wherein the first primary water treatment unit further comprises an activated carbon or sediment filter module.

13. The water distribution system as claimed in claim 1, wherein the water conduits further fluidly couple the point of water use device to the water storage tank via a water return conduit having a flow restrictor.

14. The water distribution system as claimed in claim 1 further comprising a second primary water treatment unit, wherein the first and second primary water treatment units are arranged in parallel and fluidly coupled to the diverter valve conduit.

15. The water distribution system as claimed in claim 1, wherein the diverter valve is motorized and electrically communicable with a selector switch or a programmable controller.

16. The water distribution system as claimed in claim 1 wherein the diverter valve comprises first and second diverter valve units;
wherein each diverter valve is a two port diverter valve unit.

17. The water distribution system as claimed in claim 1, wherein the pressurizing water device is selected from the group consisting of a pump, an air bleed port, and an air compressor.

* * * * *